No. 867,717.                                              PATENTED OCT. 8, 1907.
G. R. EUKERS & R. H. ATCHESON.
TIRE COVERING.
APPLICATION FILED APR. 3, 1906.

2 SHEETS—SHEET 1.

Witnesses:

Inventors:
George R. Eukers,
and Robert H. Atcheson
by
Attorney.

UNITED STATES PATENT OFFICE.

GEORGE R. EUKERS AND ROBERT H. ATCHESON, OF CHICOPEE, MASSACHUSETTS.

TIRE-COVERING.

No. 867,717.

Specification of Letters Patent.

Patented Oct. 8, 1907.

Application filed April 3, 1906. Serial No. 309,583.

*To all whom it may concern:*

Be it known that we, GEORGE R. EUKERS and ROBERT H. ATCHESON, citizens of the United States of America, and residents of Chicopee, in the county of Hampden and State of Massachusetts, have invented certain new and useful Improvements in Tire-Coverings, of which the following is a full, clear, and exact description.

This invention relates to improvements in coverings for vehicle wheel tires and more particularly available on the pneumatic tires used on automobiles.

The object of the invention is to provide an armored covering for the pneumatic tires which while efficient and reliable for the protection of the tire against puncturing is extremely flexible, and without tendency to impair the resiliency of the tire.

This improved tire covering consists of a body comprising a plurality of circularly coursed bands or cable coils arranged to conform to the shape of an annular trough, and a multiplicity of metallic link-tubes engaged with and connecting each of said bands or coils with another thereof transversely therebeyond, said tubes being provided in such number and proximate arrangement as to constitute a flexible metallic tread and protective portion for the appliance. This tire covering may be used over the ordinary outer shoe, being made separately therefrom and retained in place thereon by the inflation of the tire and the expansion of the outer shoe or it may be made as a part of the outer shoe.

The improved tire covering or armor is illustrated in the accompanying drawings in which,—

Figure 1:
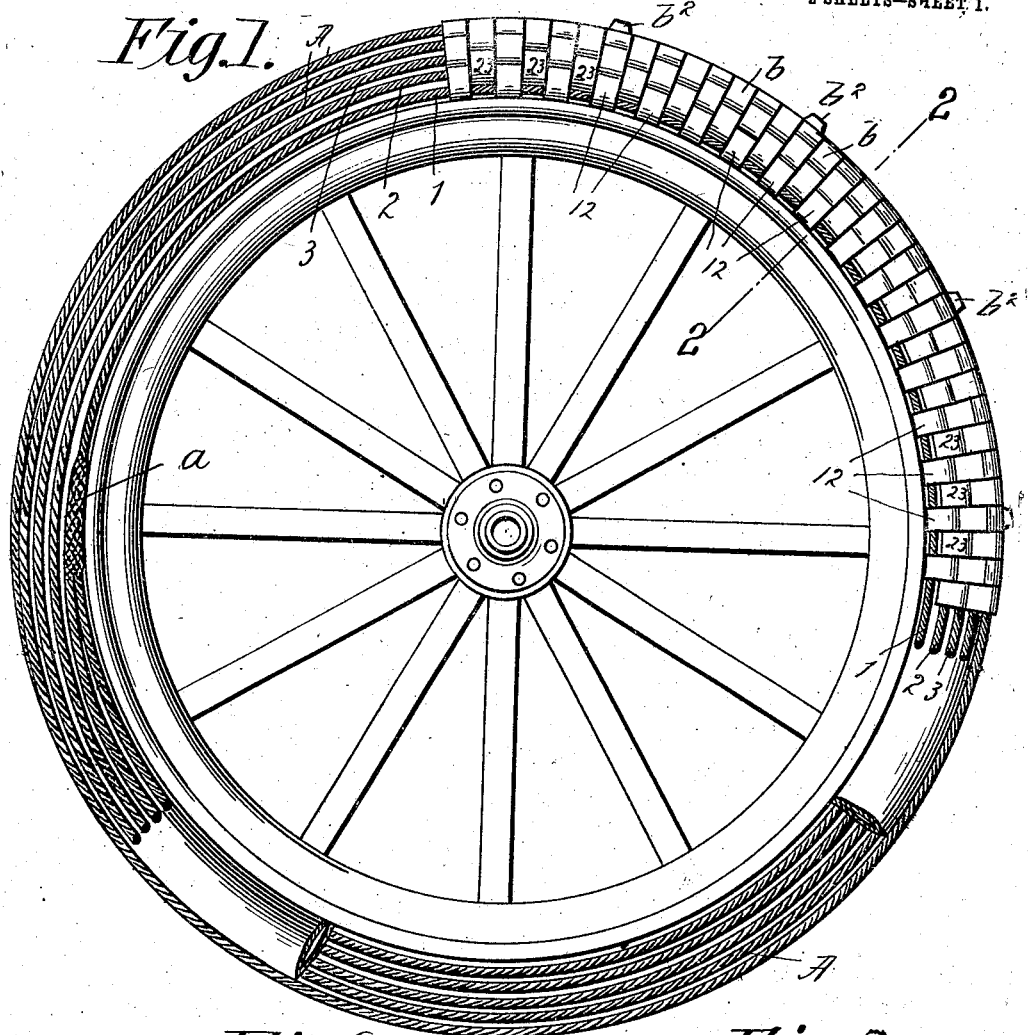
Figure 3:
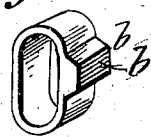
Figure 2:
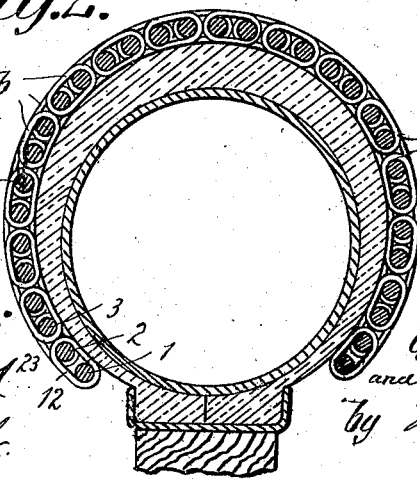
Figure 4:
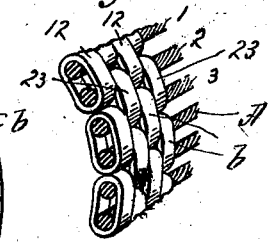
Figure 5:
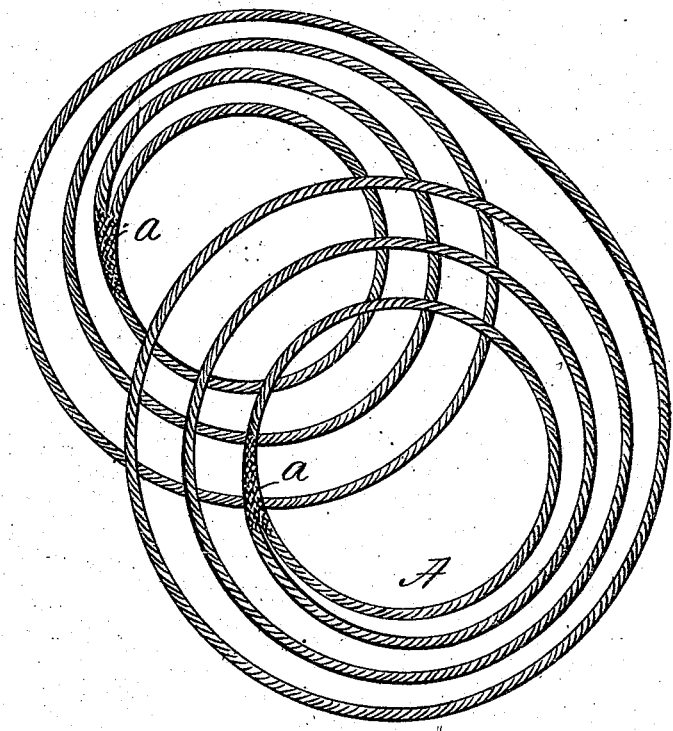

Figure 1 is a side elevation of a vehicle wheel having the improved covering thereon, with some parts broken away, and some parts omitted. Fig. 2 is a cross sectional view of the covering in place about the shoe of a pneumatic tire. Fig. 3 is a perspective view of one of the link-tubes. Fig. 4 is a perspective view showing a fragment of the covering. Fig. 5 is a perspective diagram showing the convolutions of the band or cable which makes the body of the tire covering and illustrating splicings between the outer opposite coils and the coils next therewithin.

Similar characters of reference indicate corresponding parts in all of the views.

In the drawings,—A represents a plurality of circularly coursed bands preferably constituted by the successive coils of a single wire cable, the coils being arranged quite closely together and conforming to the shape of an annular trough, as represented more particularly in Fig. 2,—the intermediate coils being larger than the outer coils which gradually diminish in their diameters whereby the trough form of the structure is acquired. The terminals of the outer and oppositely located coils are united to the coils next thereto and therewithin by splicings indicated at *a* in Figs. 1 and 5.

Metallic flattened tube links *b* are provided in repeated series, the various tube link series having alternated arrangements relatively to each other whereby those of one series engage with and connect to adjacent coils A while the relatively intermediate links of each succeeding series engage but one of the pair of coils connected by the first given link series, and engage and connect a still further sidewise located one of the coils. This may be definitely perceived and understood on reference to the drawings, Figs. 1 and 4,—one representing for instance the first coil, 2 the second and 3 the third coil, and so on. The links 12 in the first series encircle and connect the sidewise adjacent coils 1 and 2, while the links 23 have their locations transversely offset, so as to "break joints" with the links 12 12, and intermediate of which the links 23 have their places, said links 23 of the second series encircling and connecting the second and third coils, this offsetting of the alternated links of the successive series thereof being observed throughout the entire structure.

In the fabrication of the covering, the coils are successively formed in the arrangement shown in Fig. 2, and diagrammatically represented in Fig. 5 with the size of the convolutions gradually increasing from the side to the middle; the tubular links, which are preferably endless, being combined and engaged with the pairs of coils as they are successively formed, the splicings *a* at the terminals of the outer coils being made last. Such of the link tubes as are employed at intervals at the tread portion of the tire covering are provided with calks or projections $b^2$, as indicated in Figs. 1 and 3 for imparting slip preventing capabilities to the appliance.

We claim:—

1. A tire covering consisting of a body comprising a plurality of circularly coursed bands arranged to conform to the shape of an annular trough, and a multiplicity of metallic link-tubes engaged with and connecting each of said bands with another thereof which is transversely therebeyond, said tubes being provided in such number and having such proximate arrangement as to produce a flexible metallic tread and protective portion for the appliance.

2. In a tire covering a body consisting of a cable formed into a plurality of coils conformed to the shape of an annular trough, and a multiplicity of metallic link-tubes engaged with and connecting each of said coils with another thereof which is transversely therebeyond, and constituting a protective exterior to the flexible appliance.

3. In a tire covering, a body consisting of a cable formed into a plurality of coils conformed to the shape of an annular trough, and repeated series of metallic link-tubes, the various tube-link series having alternated arrangements, relatively to each other whereby those of one series engage with and connect sidewise adjacent coils, while the relatively intermediate links of each succeeding series engage but one of the pair of coils connected by the first link series, and engage and connect a still further sidewise located one of the coils.

4. In a tire covering, a body consisting of a single cable formed into a plurality of coils conformed to the shape of an annular trough, and having the terminals of the outer and oppositely located coils united to the respective coils next thereto, and therewithin, and a multiplicity of metallic link-tubes engaged with and connecting each of said coils with another thereof which is transversely therebeyond, and constituting a protective exterior to the flexible appliance.

5. A tire covering consisting of a body comprising a plurality of circularly coursed bands arranged to conform to the shape of an annular trough, and series of metallic flat faced tie pieces engaged with and connecting each of said bands with another thereof which is transversely therebeyond, said tie pieces being provided in such number and proximate arrangement as to constitute a flexible metallic exterior for the appliance.

6. A tire covering consisting of a body comprising a plurality of circularly coursed bands conformed to the shape of an annular trough, and a multiplicity of metallic ties engaged with each of said bands and connecting it with another transversely located relatively thereto, and said ties covering the bands and constituting a flexible metallic exterior for the appliance.

7. A tire covering consisting of a body comprising a plurality of circularly coursed bands conformed to the shape of an annular trough, and a multiplicity of metallic ties engaged with each of said bands and connecting it with another transversely located relatively thereto, said ties covering the bands and constituting a flexible metallic exterior for the appliance, and certain of said metallic ties at the tread portion of the tire covering having calks or projections.

8. An armor composed of a series of tubes and strands on which the tubes are strung.

9. An armor for cushion and like tires, comprising circumferentially arranged rows of tubes flexibly connected.

10. A flexible armor for tires composed of a series of short metallic tubes flexibly connected.

11. An armor composed of fabric composed of series of short tubes and metallic strands on which the tubes are strung.

12. An armor for cushion tires comprising a circumferentially arranged series of rows of short metallic tubes flexibly connected.

13. In combination with a tire, an armor therefor composed of a series of circumferentially disposed tubes and metallic strands upon which the tubes are strung.

14. An armor for cushion and like tires consisting of a fabric composed of connected impenetrable tubes.

15. An armor for tires composed of a plurality of layers of impenetrable tubes.

16. In combination with a tire, an armor therefor composed of a series of closely adjacent connected impenetrable tubes.

Signed by us at Springfield, Mass., in presence of two subscribing witnesses.

GEORGE R. EUKERS.
ROBERT H. ATCHESON.

Witnesses:
WM. S. BELLOWS,
G. R. DRISCOLL.